(12) United States Patent
Ramirez et al.

(10) Patent No.: US 10,453,081 B2
(45) Date of Patent: Oct. 22, 2019

(54) CONFIDENCE SCORE GENERATOR

(71) Applicant: Benchwatch Inc., Houston, TX (US)

(72) Inventors: Randy A Ramirez, Austin, TX (US); Jonathan M Dison, Houston, TX (US)

(73) Assignee: BENCHWATCH INC., Austin, TX (US)

( * ) Notice: Subject to any disclaimer, the term of this patent is extended or adjusted under 35 U.S.C. 154(b) by 699 days.

(21) Appl. No.: 15/202,310

(22) Filed: Jul. 5, 2016

(65) Prior Publication Data

US 2017/0011411 A1  Jan. 12, 2017

Related U.S. Application Data

(60) Provisional application No. 62/189,621, filed on Jul. 7, 2015.

(51) Int. Cl.
| | | |
|---|---|---|
| *G06Q 30/00* | (2012.01) | |
| *G06Q 30/02* | (2012.01) | |
| *G06Q 50/00* | (2012.01) | |

(52) U.S. Cl.
CPC ......... *G06Q 30/0201* (2013.01); *G06Q 50/01* (2013.01)

(58) Field of Classification Search
CPC ....................................... G06Q 30/00–30/0284
USPC ........................................... 705/14.01–14.73
See application file for complete search history.

(56) References Cited

U.S. PATENT DOCUMENTS

| | | |
|---|---|---|
| 6,112,186 A | 8/2000 | Bergh |
| 7,092,508 B2 | 8/2006 | Brown |
| 8,296,356 B2 | 10/2012 | Obasanjo |
| 8,682,911 B2 | 3/2014 | Widjojo |
| 2003/0055898 A1 | 3/2003 | Yeager |
| 2005/0144052 A1 | 6/2005 | Harding |
| 2005/0159998 A1* | 7/2005 | Buyukkokten ........ G06Q 30/02 705/319 |
| 2005/0261919 A1 | 11/2005 | Kundtz |
| 2006/0009994 A1 | 1/2006 | Hogg |
| 2008/0162296 A1 | 7/2008 | Hanif |
| 2008/0172485 A1 | 7/2008 | Du |
| 2009/0125427 A1 | 5/2009 | Atwood |

(Continued)

FOREIGN PATENT DOCUMENTS

EP        2521343        11/2012

*Primary Examiner* — John Van Bramer
(74) *Attorney, Agent, or Firm* — Boris Leschinsky

(57) ABSTRACT

A method for generating a confidence score for each member of a computer-implemented network comprises forming for each member of an individual group of other members who are known to this member and recording his or her individual member ratings for everyone in that individual group. These ratings are then collected by the network administrator and adjusted using a system-generated weight factor for each member recording such ratings. Initial and subsequent confidence scores are then calculated as additional transaction data becomes available. The confidence score for each member is presented to other members, whereby facilitating selection of a preferred member to enter into transaction therewith. The network may be a buyer/seller network, service provider network, employment network, or another network where members need to select a previously unknown party to enter into a transaction with.

13 Claims, 3 Drawing Sheets

(56) References Cited

U.S. PATENT DOCUMENTS

| | | | |
|---|---|---|---|
| 2009/0228294 A1* | 9/2009 | Choi | G06Q 30/018 705/317 |
| 2012/0296825 A1 | 11/2012 | Warner | |
| 2013/0291098 A1 | 10/2013 | Chung | |
| 2015/0142520 A1* | 5/2015 | Bala | G06O 30/0203 705/7.32 |
| 2016/0117626 A1* | 4/2016 | Baken | G06Q 30/02 705/7.42 |

\* cited by examiner

CONFIDENCE SCORE GENERATOR

CROSS REFERENCE DATA

This patent application claims a priority benefit from a U.S. Provisional Patent Application No. 62/189,621 filed Jul. 7, 2015 by the same inventors and with the same title, which is incorporated herein in its entirety by reference.

BACKGROUND OF THE INVENTION

The present invention relates generally to member networks. More particularly, the invention describes methods and systems for generating confidence scores for members of the network so as to assist other members to make a decision of entering into a transaction therewith.

Various transactions such as business transactions typically involve interactions between two or more parties. For example, a party may provide a product or service to another party in return for payment. A party may share a product or service with other people that are not personally known to that party. For example, a person may rent out a room or a house to another person who is not previously known to that person. An investor may invest money in a venture of an entrepreneur. An early stage small business may raise funding from a large number of parties using equity crowd funding. An early stage investor may raise money from one or more angel investors. Shareholders of a private company may sell their shares to accredited investors in a secondary share-market.

Parties attempt to evaluate whether they can trust another party for purposes of such a transaction. A party may consider multiple parties as potential candidates to compete for purposes of entering into a transaction therewith. The party may prefer to enter into a transaction with someone that the party considers most trustworthy. If a party does not have a good mechanism to evaluate other unknown parties, the party may reject suitable candidates with whom the party could have entered into a successful transaction. For example, an angel investor may not invest in an entrepreneur that was worth investing. Alternatively, the party may start a business transaction with an unsuitable party and realize later that the party was unsuitable. Conventional techniques may not provide a suitable mechanism for a party to determine whether another party is suitable for purposes of entering into a transaction.

The need therefore exists for an independent way to assess the confidence one party places into another for a purpose of entering into a transaction therewith.

Electronic commerce is a common example of a network of users which permits buyers to purchase products, services, and other items from sellers via data networks such as the Internet. Conventionally, marketplace operators solicit feedback on sellers from buyers—typically as a quantitative rating and/or textual narrative—and publish this feedback to buyers in the marketplace.

This conventional approach has several significant disadvantages. First, the ratings can be unfairly manipulated by buyers, or even by sellers impersonating buyers. Second, the ratings omit potentially important information, such as information known only to the infrastructure provider such as a system administrator.

The need further exists for system-generated confidence score that accounts for such limitations of the present day member networks.

SUMMARY OF THE INVENTION

Accordingly, it is an object of the present invention to overcome these and other drawbacks of the prior art by providing a novel method and system for connecting individual members seeking to enter into transactions with one another and to provide members with individualized member ratings based on weighted confidence scores.

It is another object of the present invention to provide a method of forming for each member of a group of other members who are known for that member such that the member can rate other members in his group.

It is a further object of the present invention to provide a method for adjusting individualized member scores using system-generated weighting factors, as well as a combination of system-generated weighting factors and personalized weighting factors.

It is yet a further object of the present invention to provide a method for calculating and presenting a confidence score which accounts for whether the member is known to (and rated by) other members as well as the history of transactions by the member.

In a broad sense, the novel method of the present invention may be implemented by first connecting of a plurality of members with a computer-implemented network, where these members are seeking to enter into transactions with other members. Advantageously, such computer-implemented network may be using an Internet for such member connections. Each member of the network may then form an individual group of other members who are known to this member and record his or her individual member ratings for everyone in that individual group. These individual ratings may then be collected by the network administrator or the system and used to calculate a consolidated confidence score for each individual member of the network. This calculation may be based not only on the individual member ratings but also on a system-generated weight factor for each member using a predefined weight factor criteria, which may be applied to the individual member ratings. Once the confidence score for each member is calculated, it may be presented to other members of the network, whereby facilitating selection of a preferred member to enter into transaction therewith.

In embodiments, following initial determination of the confidence score, the system may be configured to collect transaction information and subsequently adjust the confidence score as new transaction information or more individual ratings data becomes available.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE PREFERRED EMBODIMENT OF THE INVENTION

Figure 1:
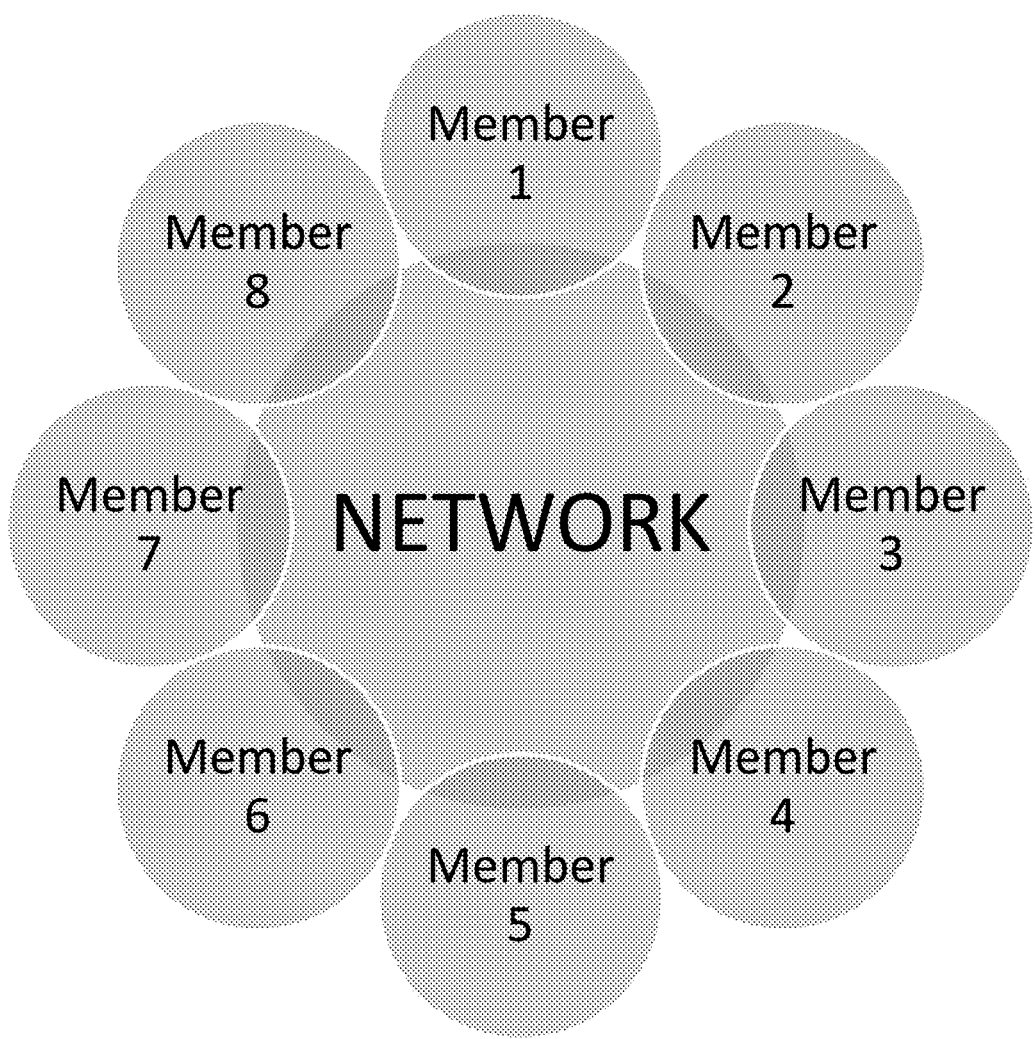
FIG. 1 shows a schematic diagram of a network of members in accordance with one or more embodiments of the invention.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present invention generally concerns with computer-implemented systems connecting a plurality of members who may be interested in entering into a transaction with one another. One example of such as network may be a group of buyers and sellers. An example of a network is seen in FIG. 1 connecting members who may be buyers only, sellers only or both buyers and sellers. A transaction in this case may be an act of selling goods or services from a seller to a buyer. Other examples of suitable networks may include service providers and service consumers; labor sellers and buyers such as employees and employers; real estate renting or buying, etc.

Connecting a small number of members may not be all difficult especially when all members know each other. The problem becomes much more complicated when the number of members grows to hundreds and even thousands. In such circumstances, each member may personally know only a handful of other members. At the same time, when a member is searching for another member to enter into a transaction with, a previously unknown member may be a much better option than any other member who is already known to this member. Seeking another unknown member may prove to be difficult without a trusted way to assess the credibility of other unknown members.

The present invention addresses this problem by providing a computer-implemented network to connect individual members together and providing a confidence score for other members who may not be personally known to each other, whereby facilitating a process of selecting a best member to enter into a transaction with.

In embodiments, methods for generating of a confidence score for each member of the network may include a number of steps as described in detail below.

After initial connection of the members with a computer-implemented network, at least some or all of the members are assigned initial confidence scores. These confidence scores may be calculated based on ratings by other members as adjusted based on weight factors as described in greater detail below.

Figure 2:
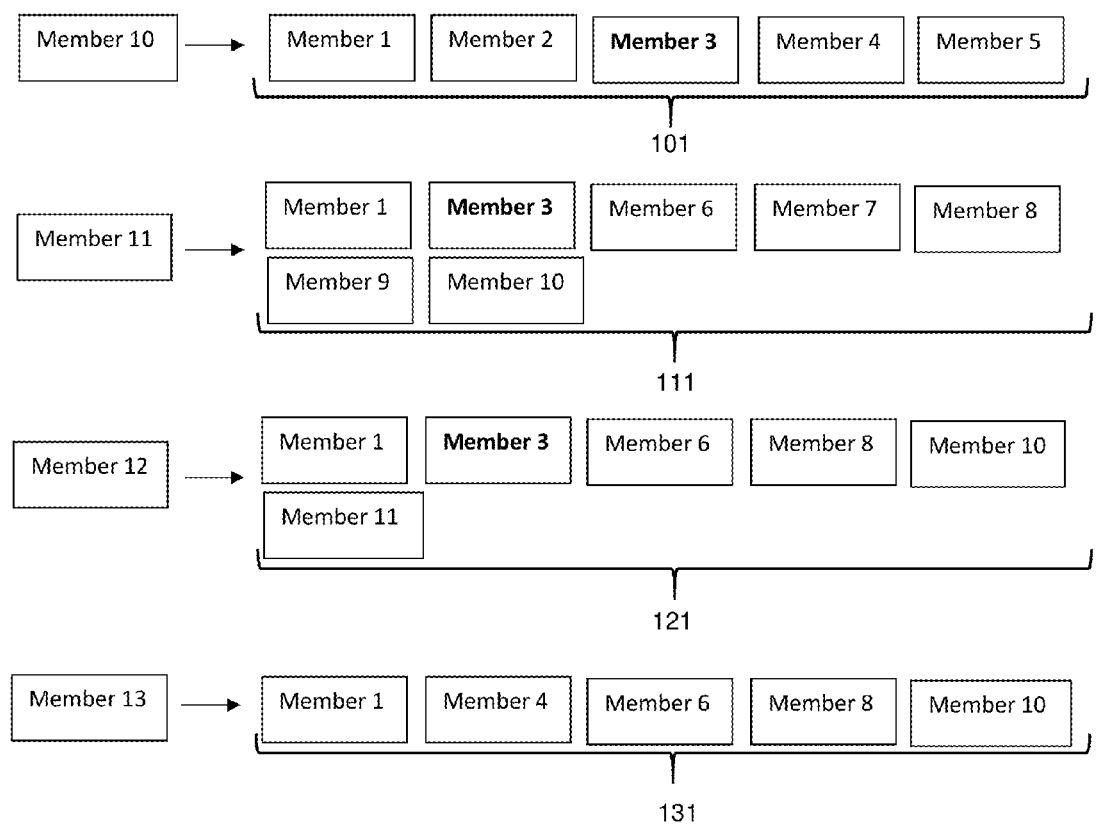
FIG. 2 shows exemplary individual groups of other members in accordance with one or more embodiments of the invention.

FIG. 2 shows exemplary members of the network (members 10, 11, 12, 13) forming individual groups of other members who are known to them. In this example, member 10 selects members 1, 2, 3, 4, and 5 as individual group 101; member 11 selects members 1, 3, 6, 7, 8, 9, and 10 as individual group 111; member 12 selects members 1, 3, 6, 8, 10, and 11 as individual group 121; and finally member 13 selects members 1, 4, 6, 8, and 9 as individual group 131. Of note is that one individual member may be selected as known by one, several or all of other members. In the example shown in FIG. 3, member 3 is selected by members 10, 11, and 12—as highlighted using bold font.

Also of note is that an individual member may select other members for his own individual group of known members—as well as this member may be in turn selected by other members for the same purpose. As seen in FIG. 2, member 10 may be selected by member 11 and member 12 and subsequently rated by these other members.

Once each member selects other members who are personally known to that member, this member may assign an individual member rating to all other members in his individual group. In embodiments, the individual member rating may be a score, for example from 0 to 10. In other embodiments, the individual member rating may be a classification selection from available choices, for example:

a. Trusted—members ready for immediate contact when a need arises—maximum numeric value of 3 points;
b. Known—members who may be known personally and trusted but there is no sufficient history of collaboration to formulate an opinion for a recommendation—middle numeric value of 2 points; and
c. Acquaintance—members who are known personally but most likely will not be chosen to enter into a transaction with—minimum numeric value of 1 point.

In embodiments, additional categories for classification of other members may be used—initially or added at a later time.

Individual member ratings may then be collected by the system administrator and processed to calculate the confidence score for all members. This may be accomplished in a way that adjusts an average individual member rating by assigning a weight factor for each member using a pre-defined weight factor criteria. Vetting of member ratings is one of the most important features of the present invention as it allows for other members to trust the confidence score of other members in order to select a preferred party for themselves. High reliability of confidence scores is critical for implementation of the methods of the present invention.

The weight factor criteria may be initially defined and subsequently adjusted based on a number of factors. These factors may increase the weight factor for a member (positive metrics) or decrease the weight factor (negative metrics). In embodiments, such factors influencing the weight factor may include one or more of the following:

a. Number of proposed and/or completed transactions with other members: Initial weight factor may be set to zero for members without a history of any transactions so as to diminish their influence on the combined confidence score. Adding a history of transactions may lead to an increase in the weight factor as experience of members may be of more interest to other members;
b. History of transactions: recent experiences with transactions may be valued higher than older experiences;

c. Sent opportunities: A member may send another member one or more opportunity for a transaction. Positive metrics example: a member sends 10 opportunities and receives 6 interested responses. Negative metrics example: a member sends 10 opportunities and receives 0 responses;
d. Received Opportunities: A member may receive a number of opportunities for transactions. Positive metric example: a member receives opportunities and responds to each of them. Negative metrics example: a member doesn't receive opportunities or a member receives opportunities but doesn't respond.
e. Receive Opportunities Referral: A member may choose to recommend another member for a transaction opportunity. Positive metrics example: a member responds to an opportunity and sends a referral.
f. Statement of Work (SOW) Process: Upon mutual agreement to proceed forward with a transaction, both Opportunity Sender and Opportunity Recipient will move into the Statement of Work phase. Positive metrics example: a member starts and completes the SOW process. Negative metrics example: a member doesn't complete one or multiple SOW processes that have been initiated.
g. Transactions Completed: After a successful SOW is executed, the Opportunity Sender status may be changed to a Transaction Owner.

Other factors may include a history of completion of proposed transactions; completeness of a members profile; a history of generating and paying invoices for transactions; a history of providing satisfying results and meeting expectations, etc—these factors may be adjusted and defined based on individual needs of a particular member network and the nature of transactions to be entered into by network members.

EXAMPLE

The following is an example of calculating a confidence score for Member 3 as seen in FIG. 2.

In member's 10 individual group, member 3 is rated as Trusted (3 points). Member 10 has 2 SOWs and 12 received opportunities for a transaction, whereby his weight factor is calculated as follows: 2+12=14. In embodiments, the total weight factor may have an upper limit so as to distribute the influence of individual members more evenly within the network. In this example, the upper limit of the weight factor may be set at 10. In this case, the weighted individual rating for member 3 is calculated as 3×10=30.

In member's 11 individual group of members, member 3 is rated as Known (2 points). Member 11 has 0 SOWS and 4 received opportunities. His weight factor is calculated as follows: 0+4=4 and the weighted individual member 3 rating is 2×4=8.

In member's 12 individual group of members, member 3 is rated as Trusted (3 points). Member 12 has 14 SOWS and 8 received opportunities. His weight factor is calculated as follows: 14+8=22 and then reduced to a maximum upper limit of 10. The weighted individual member 3 rating is 3×10=30.

The Confidence Score is calculated then as follows: (3×10+2×4+3×10)/(10+4+10)=2.8 points.

In general, the equation for such calculations is as a sum of all weighted individual ratings divided by the sum of all weight factors:

$$(R1 \times F1 + R2 \times F2 + \ldots + Rn \times Fn)/(F1+F2+ \ldots +Fn),$$

where R is an individual rating of a member, F is a weight factor of a member providing the individual rating for another member and n is a number of members allowed to enter the individual ratings.

Once the confidence score is calculated for an individual member, it may be displayed (without the details of its calculations) for other members so as to inform them of the status and level of trust in that member by other members.

As may be appreciated by those skilled in the art, initial calculations may be adjusted over time as more transactions are entered into the system as a history of such transactions may affect the weight factors for various members of the network.

In embodiments, other factors may be entered to affect the confidence score. For example, if excessive number of opportunities to enter into a transaction remains open for a particular member, a penalty factor may be added to the confidence score (such as reducing the score by 10%). The penalty factor by itself may be calculated on a progressive scale or based on a history and status of prior transactions by the member. For example, if 10 or more transactions are pending or not complete, the penalty factor may be set at 10%, for 20 pending transactions or more, the penalty factor may be set at 20%, and so on.

In further embodiments, a score of succeeding along a predetermined path of prior transactions may be used to adjust weight factors of individual members. Typical steps of progression of a transaction may be predetermined and taken into account to adjust the weight factors or the final confidence score. This can be done manually or using machine learning. In one example of a consulting opportunities network, such machine learning may be based on predefined transaction paths that can be recorded by the system administrator and applied automatically to adjust the weight factors. For a consulting network, the path of a transaction may be recorded in the following generic steps:

1. Consultant receives opportunity
2. Consultant responds as interested
3. Consultant negotiates Statement of Work with Client
4. Consultant and Client approve the Statement of Work
5. Consultant enters timesheets and sends them to Client
6. Client approves timesheets
7. Client pays
8. Consultant receives payment In embodiments, each successive step may be assigned a higher weight factor. In other embodiments, analysis of transaction histories may allow a determination of the critical step of most frequent failure along this path. In that case, asymmetric weighting factors may be applied to the steps in the path with more weight assigned to steps after the most frequent critical step, where transactions typically fail to advance.

As a history of transactions accumulates and other factors change, the confidence score of at least some members may change. A trend of such changes may be of interest to other members in their assessment of a potential value of a member for a contemplated transaction. In at least some embodiments, such trend history may also be presented along with the current confidence score value. Such trend may be assessed for a predetermined period of time, for example for the past 6 months, 12 months, 18 months, etc. As can be appreciated by those skilled in the art, the length of a period of time may affect the direction of the trend. For example, for a member 3, the confidence score may increase over the past 6 months but overall fall over the past 18 months. In at least some embodiments, a single trend may be presented to other members. In other embodiments, a series of trends may be presented using a predefined periods of time. In yet further embodiments, other members may specify a period of time over which a trend of change in the confidence score is computed. The trend information may be presented as a directional classification ("increased", "decreased", "steady"), as a percentage of change, as an absolute value of change or in any other suitable way.

The method of the present invention may also be further modified with a recognition that for a given member looking at confidence scores of other members, there is an important distinction as to whether such confidence scores have been determined using individual ratings of other unknown members or at least of these individual ratings are entered by members known to this given member personally. In this case, such member may trust these ratings more than those from unknown members.

To account for such distinction, a confidence score for a member of the network may not be a fixed number calculated based on other member's individual ratings and adjusted by system-generated weight factors. Instead, such confidence score may be variable and presented as different numbers to different members. Such individualized confidence score presentation may be based on determination as to whether the members providing individual ratings are known to an interested member or not.

This can be explained referring to FIG. 2 again. In this case, the confidence score for Member 3 is calculated using individual ratings of Members 10, 11, and 12. When Member 13 is looking at the confidence score of member 3, such score may not be presented using only system-generated weight factors for Members 10, 11, and 12 as discussed above. Instead, there is a recognition that Member 10 is known to Member 13 and individually rated by him, while Members 11 and 12 are not. In this case, the individualized confidence score for Member 3 may be calculated and presented to Member 13 using the system-generated weight factors for Members 11 and 12 and using the individualized rating of Member 10 by Member 13 as a weight factor in this calculation. As can be appreciated by those skilled in the art, other members will be presented with slightly different individualized confidence score for Member 3 depending on whether they know and how they rated personally Members 10, 11, and 12.

The concept of accounting for personal connections in presenting individualized confidence score may be extended further. In embodiments, it may account for a second layer of connections, in which a member may know another member who in turn knows and provides a rating for a third member of interest. The value of second level connections may be reduced as compared with the value of first level connections when members know each other personally. One example of such reduced value in accounting for second level connections is to (i) substitute a system-generated weight factor for an individual rating of a member for first level connections as described above, while (ii) use an average of a system-generated weight factor and an individualized rating of a member for second level connections between the members of the network.

Figure 3:
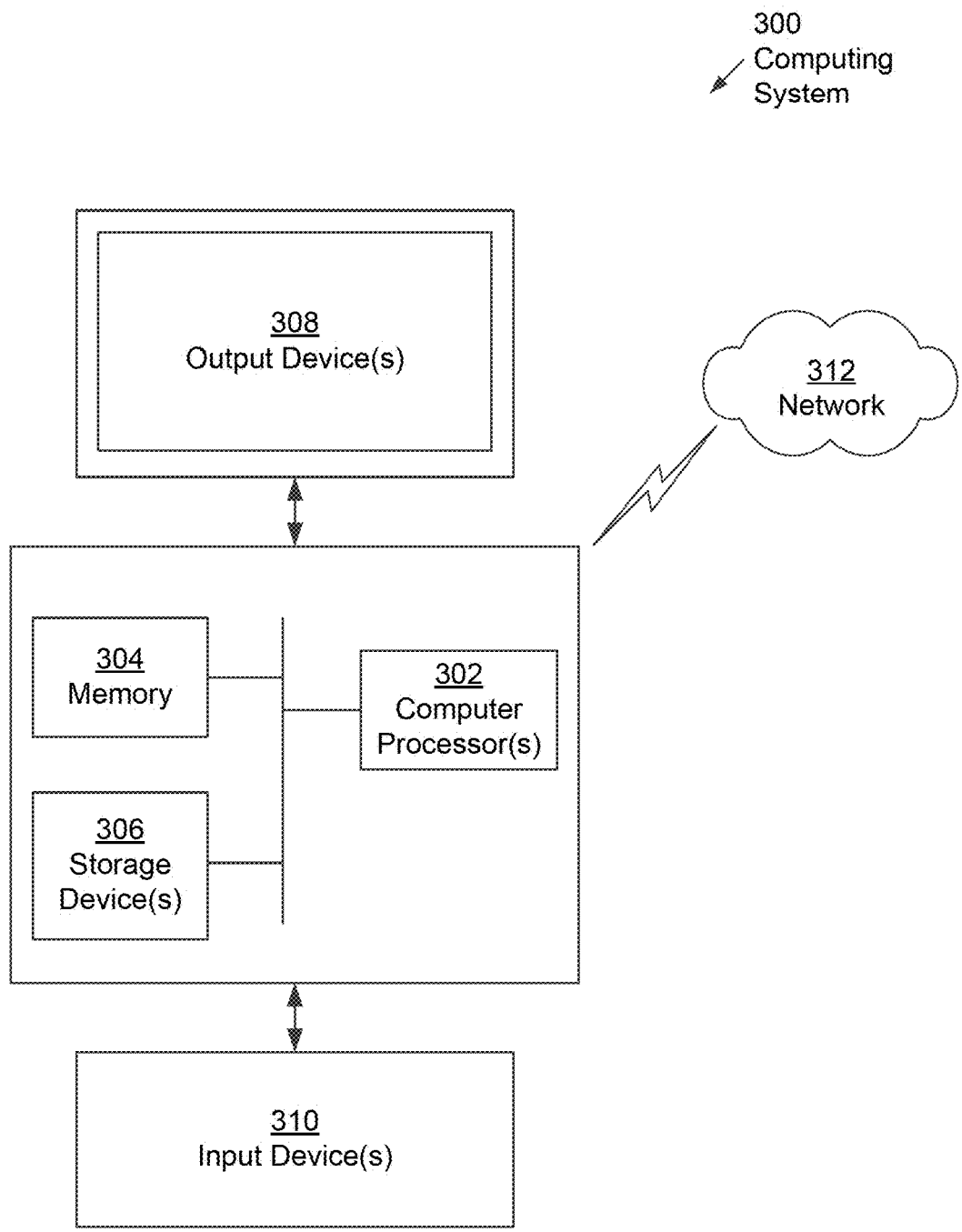
FIG. 3 shows a computing system in accordance with one or more embodiments of the invention.

Embodiments of the present invention may be implemented as a software program on a computing system. Any combination of mobile, desktop, server, embedded, or other types of hardware may be used. For example, as shown in FIG. 3, the computing system 300 may include one or more computer processor(s) 302, associated memory 304 (e.g., random access memory (RAM), cache memory, flash memory, etc.), one or more storage device(s) 306 (e.g., a hard disk, an optical drive such as a compact disk (CD) drive or digital versatile disk (DVD) drive, a flash memory stick, etc.), and numerous other elements and functionalities.

The memory 304 may include functionality to store member's administrative information (e.g., contact virtual and real address(es), identifier(s), authentication information, any other administrative information, or any combination thereof), historical information about transactions, individual member ratings, any other information, weight factors for various members, or any combination thereof. For example, the historical information may include information about sent and received opportunities for work, completed transactions and projects, statements of work that are provided to members, and other information.

The computer processor(s) 302 may be an integrated circuit (IC) for processing instructions. For example, the computer processor(s) may be one or more cores, or micro-cores of a processor. The computing system 300 may also include one or more input device(s) 310, such as a touch-screen, keyboard, mouse, microphone, touchpad, electronic pen, or any other type of input device. Further, the computing system 300 may include one or more output device(s) 308, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 300 may be connected to a network 312 (e.g., a local area network (LAN), a wide area network (WAN) such as the Internet, mobile network, or any other type of network) via a network interface connection (not shown). The input and output device(s) may be locally or remotely (e.g., via the network 312) connected to the computer processor(s) 302, memory 304, and storage device(s) 306. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 300 may be located at a remote location and connected to the other elements over a network 312. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for facilitating assessment of a previously unknown member by generating an individualized confidence score, said method comprising the following steps:
   a. connecting with a computer-implemented network of a plurality of members seeking to enter into transactions with other members,
   b. for a first member of said network, forming an individual group of other members of said network personally known to said first member,
   c. for each member of said individual group of other members in step (b), recording said member rating as rated by said first member,
   d. providing a system-generated weight factor for said first member of said network using a predefined weight factor criteria, stored in a memory of said computer-implemented network,
   e. using a computer of said computer-implemented network to apply said system-generated weight factor to said first member ratings of other members recorded in step (c) to form and record weighted first member ratings for each member of said individual group of other members in step (b),
   f. using said computer of said computer-implemented network, repeating steps (a) to (e) for a second member and further for all other members of said network so as to collect weighted individual member ratings for each member of said network,
   g. in response to an inquiry from an interested member about another member of said network previously unknown to said interested member, operate said computer to calculate and provide said interested member with an individualized confidence score for said another member calculated using said computer, said individualized confidence score based on weighted individual ratings of said another member by further members of said network, said individualized confidence score is further calculated using said computer based on how many of said further members are recorded by said computer as personally known to said interested member,
   whereby said individualized confidence score for each member of said network is calculated differently depending on the identity of said inquiring interested member,
   thereby facilitating personalized assessment by one interested member of one or more of said another members previously unknown by said interested member for a purpose of entering into a transaction with the most suitable member of said network.

2. The method as in claim 1, wherein said computer of said computer-implemented network is operated to determine said individualized confidence score using an average of:
  i. a first group of weighted ratings by said further members who are recorded by said computer as not personally known to said interested member, said first group of weighted ratings are calculated using system-generated weight factors, and
  ii. a second group of weighted ratings by said further members who are recorded by said computer as personally known to said interested member, said second group of weighted ratings are calculated using individual weight factors recorded from said interested member.

3. The method as in claim 2, wherein weight factors of said second group of ratings is higher than the system-generated weight factors of said first group of ratings, whereby emphasizing ratings by members who are personally known to said interested member.

4. The method as in claim 1, wherein said system-generated weight factor for an individual member is set to zero in the memory of said computer when said individual member has no record of any transactions with other members of said network.

5. The method as in claim 1, wherein said system-generated weight factor for an individual member is limited by a predefined upper limit.

6. The method as in claim 1, wherein said individualized confidence score is automatically adjusted by said computer when at least one or more transactions are entered for members providing said individual ratings in step (c).

7. The method as in claim 1, wherein said step (g) further comprising applying a predetermined penalty factor to the calculated said individualized confidence score if a condition for applying said penalty factor is satisfied.

8. The method as in claim 6, wherein said penalty factor is calculated based on a history and status of prior transactions by said member.

9. The method as in claim 1, wherein in step (e) said system-generated weight factor is adjusted based on a score of succeeding along a predetermined path of prior transactions.

10. The method as in claim 1, wherein said step (g) further comprises presenting a trend of change of the individualized confidence score along with the current value thereof.

11. The method as in claim 10, wherein said trend of change is determined over a predetermined period of time.

12. The method as in claim 1, wherein said individualized confidence score is automatically adjusted by said computer when additional weighted individual member ratings become available.

13. The method as in claim 1, wherein said members are prospective employers and prospective employees and said transactions are labor buying and labor selling, thereby said individualized confidence scores are used for hiring decisions of said employers when assessing previously unknown prospective employees.

* * * * *